United States Patent [19]

Osuna-Diaz

[11] 4,196,855

[45] Apr. 8, 1980

[54] INJECTION CYLINDER NOZZLE FOR MOLDING MACHINES

[75] Inventor: Jesus M. Osuna-Diaz, Rochester, Mich.

[73] Assignee: Incoe Corporation, Troy, Mich.

[21] Appl. No.: 920,262

[22] Filed: Jun. 29, 1978

[51] Int. Cl.² ............................................. B29F 1/03
[52] U.S. Cl. ................................... 239/135; 239/600; 425/549
[58] Field of Search ................. 425/549; 239/135, 600

[56] References Cited

U.S. PATENT DOCUMENTS 4,010,903  3/1977  Sakuri ........................... 425/549 X

FOREIGN PATENT DOCUMENTS 2539785  3/1977  Fed. Rep. of Germany ........... 425/549
1478731  7/1977  United Kingdom .................... 425/549

*Primary Examiner*—Thomas P. Pavelko
*Attorney, Agent, or Firm*—Harness, Dickey & Pierce

[57] ABSTRACT

A machine nozzle attached to the barrel of an injection molding machine. The nozzle comprises a body having a central passage and surrounded by a coiled electric heater extending substantially the full length of the body. A cover surrounds the heater, and a removable retainer is attached to the end of the body, so that the heater may be easily removed and replaced. The new construction eliminates problems inherent in previous machine nozzles and is capable of accurate temperature control so as to improve molding quality.

9 Claims, 3 Drawing Figures

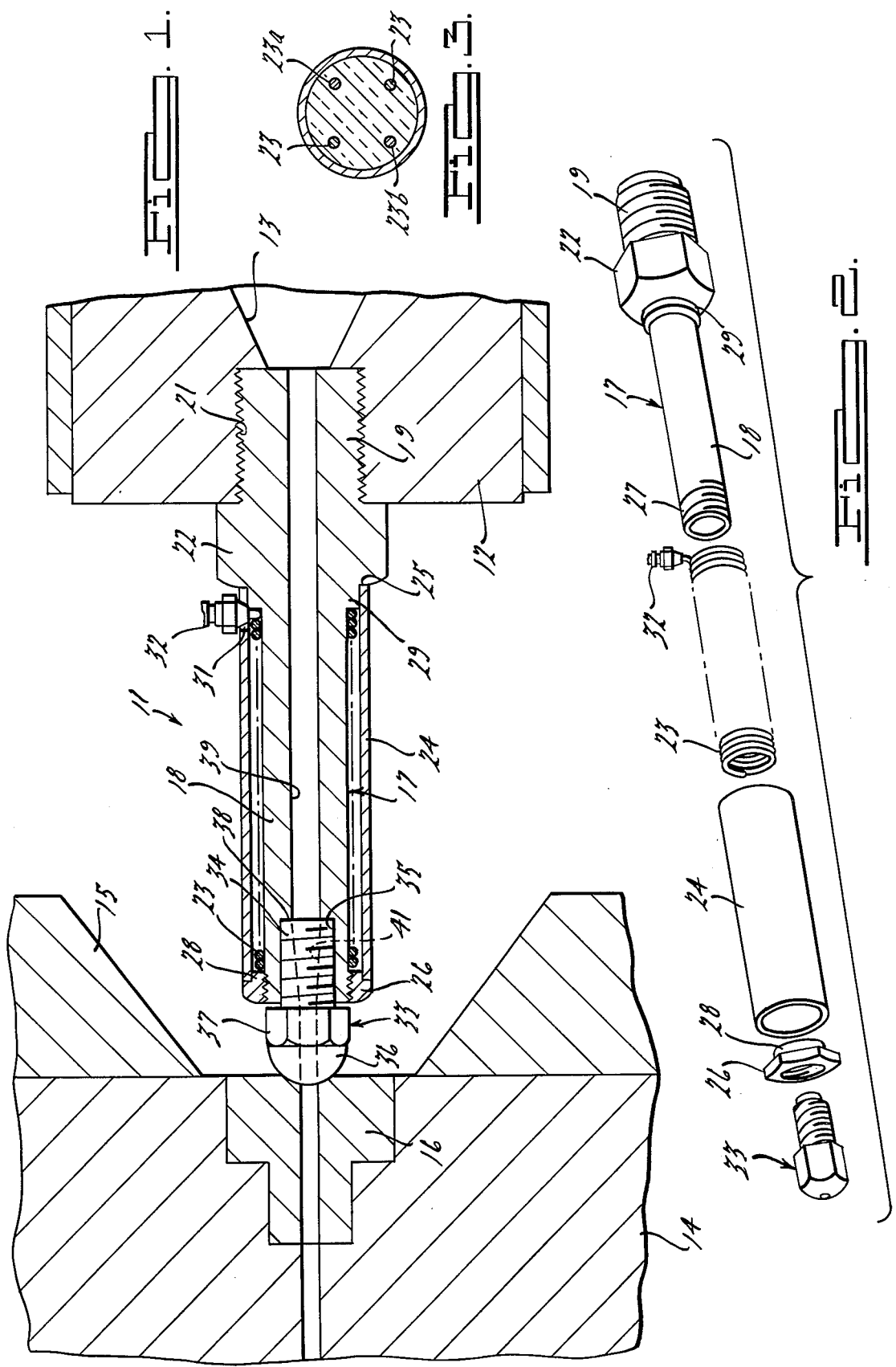

INJECTION CYLINDER NOZZLE FOR MOLDING MACHINES

BACKGROUND OF THE INVENTION

1. Field of the Invention

The invention relates to molding machines, and particularly to the machine nozzle attached to the barrel of the heated injection cylinder and which engages the platen or manifold, delivering an intermittent flow of plastic as controlled by the machine cycle.

2. Description of the Prior Art

It is known to provide temperature control equipment for the machine barrel of molding equipment, this control means being rather elaborate and expensive. Temperature control means are also known for the sprue bushing and mold. However, in the past, attention has not been paid to the part which connects these two components of molding equipment, namely, the machine nozzle. Presently, machine nozzles are constructed with either external heating bands surrounding the nozzle body or a plurality of cartridge heaters which are inserted in axial bores in the body. Manual rheostats are conventionally provided for controlling the temperature by means of these heaters.

Aside from the obvious disadvantage of manually adjustable equipment, external heater bands and cartridge heaters have not been able to provide the required uniform distribution of heat in the machine nozzle. In the case of external heater bands, the fact that they do not extend along the entire shell housing of the machine nozzle creates cold spots at certain locations on the nozzle. This causes "splay" which are milky streaks created by the partial setting of some of the plastic being injected. In the case of cartridge heaters, since they are at circumferentially spaced locations around the body, portions of the plastic conduit between these locations are sometimes insufficiently heated, causing similar problems.

Other disadvantages of previous machine nozzles with the above-described heating means include, in some cases, short life of the heaters where they are of relatively small size for the amount of heat required. Moreover, cartridge heaters are relatively difficult to remove when replacement is required since they sometimes get stuck in the bores. In the case of machine nozzles with external heaters, another disadvantage is the possibility of leakage spray of molten plastic from between the nose of the machine nozzle and the manifold, causing damage to the external heater.

Applicant is aware of co-pending patent application Ser. No. 870,849 filed Jan. 19, 1978, by David M. Reitan and assigned to the assignee of the present application. This co-pending application shows a sprue bushing which bears some similarity to the machine nozzle of the present invention. However, several important structural features of the present invention are not found in this co-pending application. Moreover, the purpose and function of sprue bushings are quite different than those of machine nozzles. In this sense, therefore, the above-identified co-pending application is not considered to be pertinent to the present invention.

BRIEF SUMMARY OF THE INVENTION

It is an object of the present invention to provide a novel and improved machine nozzle construction for the barrels of molding machines which overcomes the above-described disadvantages of previously-known machine nozzles and is capable of accurate temperature control, thus permitting the machine user to derive full effectiveness from the entire assembly, including the temperature controls for the machine barrel as well as sprue bushing and mold.

It is a further object to provide an improved machine nozzle of this character which reduces substantially the likelihood of cold spots or other non-uniform heating which could cause splay.

It is also an object to provide a novel machine nozzle of this character which is so constructed as to minimize the possibility of damage due to leakage spray between the machine nozzle nose and the manifold.

It is another object to provide an improved machine nozzle of this nature which permits quick and easy removal and replacement of the heating element.

Briefly, the molding machine nozzle of this invention comprises an elongated body, means at one end of said body for securing the body to a molding machine barrel, a tip extending from the other end of said body for engagement with a manifold, a central plastic conduit extending through said body, securing means and tip, an electric coil heater surrounding and extending substantially along the entire length of the body, a cylindrical cover surrounding said coil heater, and a retainer removably mounted on one end of said body carrying said tip, said retainer engaging said coil heater and cover and being removable whereby said cover and heater may be removed fowardly from said body.

BRIEF DESCRIPTION OF THE DRAWINGS

FIG. 1 is a side elevational view in cross-section of the machine nozzle shown with its adjacent parts.

FIG. 2 is an exploded view of the machine nozzle components.

FIG. 3 is an enlarged cross-sectional view of the combined thermocouple and coiled heater.

DESCRIPTION OF THE PREFERRED EMBODIMENT

The novel machine nozzle of this invention is generally indicated at 11 in FIG. 1 and is adapted to be mounted on the machine barrel 12 of a molding machine. The machine barrel has a passage 13 leading to the nozzle, which conducts an intermittent flow of molten plastic as controlled by the machine cycle. The plastic is delivered by the nozzle to a manifold 14 carried by the machine platen 15 and which has a bushing 16 engaged by the nozzle.

Machine nozzle 11 comprises a body generally indicated at 17 which is of elongated shape and has a main cylindrical portion 18. Machine barrel attaching means is formed at one end of this body, in the form of an externally threaded extension 19 mounted in a complementary threaded bore 21 of the machine barrel. A shouldered portion 22 is formed on body 17 between main portion 18 and threaded portion 19, this portion of the body being engageable by a tool so as to tighten the shouldered portion against the end face of the machine barrel.

An electrical heating coil 23 surrounds substantially the entire length of main portion 18 of the body. This heating coil is in contact with the body and will maintain its heat uniformly along the entire length thereof and entirely around its circumference, with no "cold spots" or portions which are less heated than others. Suitably, a thermocouple having elements 23a and 23b is combined with the coiled heater, acting as an internal thermocouple in a manner known in the art in conjunction with a temperature control system. Thus, the temperature of machine nozzle 11 may be accurately controlled along with the controls of other portions of the machine.

A cover 24 is placed around coil 23, comprising a cylindrical member slightly longer than the coil. One end 25 of this cover engages shouldered portion 22. A removable retainer, in the form of a nut 26, is provided for coil 23 and cover 24. This nut is mounted on an externally threaded portion 27 of body 17, which forms an extension of main portion 18 thereof. Shoulders 28 and 29 are formed on nut 26 and body 17 respectively, shoulder 29 being disposed between main portion 18 and shouldered portion 22 of the body. These two shoulders support the opposite ends of cover 24 in concentric relation with the body. A open-ended slot 31 is formed in cover 24 at its end adjacent shoulder 29, this slot being for the purpose of accommodating a single electrical lead 32 which is connected both with heating coil 23 and thermocouple 23a, 23b. Lead 32 may thus be adapted in a suitable location at any position 360° around body 18.

A tip generally indicated at 33 is provided for the outer end of nozzle 11. This tip has an externally threaded mounting portion 34 threaded into an internally threaded portion 35 at the outer end of body portion 18. A rounded nose portion 36 is formed at the end tip 33, and a tool-engageable portion 37 is disposed between portions 34 and 36 for mounting and removing the tip. When mounted, the inside shoulder 38 of the tip will engage a corresponding shoulder in the body so as to insure a continuous passage. Various sizes of tips may be used to suit requirements.

A plastic conduit 39 in the form of a central passage extends through body 17. This conduit is connected to an aligned passage 41 centrally formed in tip 33 which will lead the molten plastic from machine barrel 12 to manifold 14.

In operation, nozzle 11 may be assembled in the manner shown in FIG. 2, with heating coil 23 being slipped over body portion 18, cover 24 slipped over the heating coil and mounted on shoulder 19, and nut 26 threaded onto body portion 27 with its shoulder 28 inserted in the adjacent end of cover 24. Tip 33 may then be mounted on the body. Electrical lead 32 may be placed in any circumferential position, but is preferably so arranged as to lead upwardly from the assembly. This will prevent the possibility of damage from any drippings or leakage spray from molten plastic at the juncture of nose 36 with bushing 16.

During use of the nozzle, heat will be uniformly applied so as to avoid the above-described problems with respect to the plastic, and accurate temperature control is realizable. When it is desired to remove and replace the heating coil, it is merely necessary to remove nut 28 (first removing tip 33 if the tip diameter makes this necessary), and then slipping off cover 24 and heating coil 23 forwardly. The new heating coil may be placed on the body and cover 24 replaced, its slot 31 clearing the lead 32 of the heater. Nut 28 and tip 33 may then be replaced.

While it will be apparent that the preferred embodiment of the invention disclosed is well calculated to fulfill the objects above-stated, it will be appreciated that the invention is susceptible to modification, variation and change without departing from the proper scope or fair meaning of the subjoined claims.

I claim:

1. A molding machine nozzle comprising an elongated body, means at one end of said body for securing the body to a molding machine barrel, a tip extending from the other end of said body for engagement with a manifold, a central plastic conduit extending through said body, securing means and tip, an electric coil heater surrounding and extending substantially along the entire length of said body, a cylindrical cover surrounding and shielding said coil heater, supporting means on said body engageable by one end of said cover, and a retainer removably mounted on the end of said body carrying said tip, said retainer engaging said cover and being removable whereby said cover and heater may be removed forwardly from said body.

2. The combination according to claim 1, said securing means comprising an externally threaded extension on said body, and said supporting means comprising a tool-engageable shouldered portion between said extension and said body, said externally threaded extension being engageable with the end of the machine barrel.

3. The combination according to claim 1 or 2, further provided with a lead connected to said electric coil heater at the end of said body adjacent said securing means, said cover having a slotted portion accommodating said lead.

4. The combination according to claim 3, said retainer comprising a nut threaded on said body.

5. The combination according to claim 4, said tip being threadably mounted in the end of said body.

6. The combination according to claim 1 or 2, said retainer comprising a nut threaded on said body, and a shoulder on said nut.

7. The combination according to claim 6, further provided with a lead connected to the end of said electric coil heater adjacent said securing means, and an open-ended slot in said cover receiving said lead, said tip being threadably mounted in said body.

8. The combination according to claim 1, further provided with a lead connected to said electric coil heater, and means for aligning said lead in a suitable location at any position 360° around the body.

9. The combination according to claim 1 or 8, said coil heater being combined with a thermocouple having elements which are encased and coiled with said heater, and a single electrical lead connected to said heater and thermocouple.

* * * * *